July 7, 1931.  J. E. VILLATORE ET AL  1,813,370
HUNTER'S DUCK DECOY
Filed Sept. 24, 1929
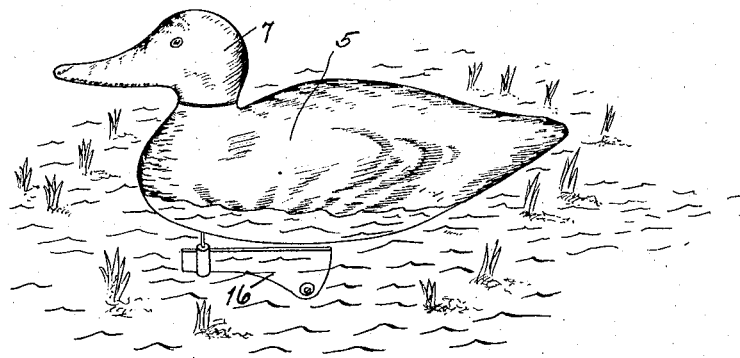
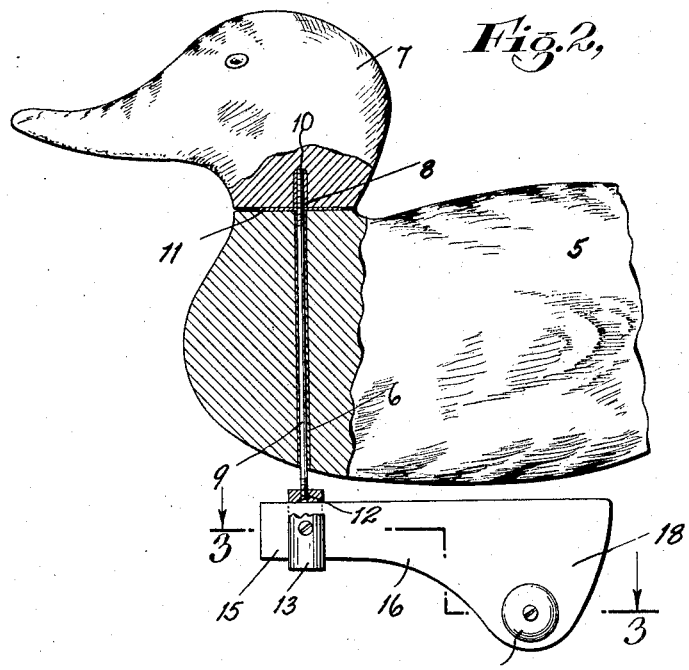
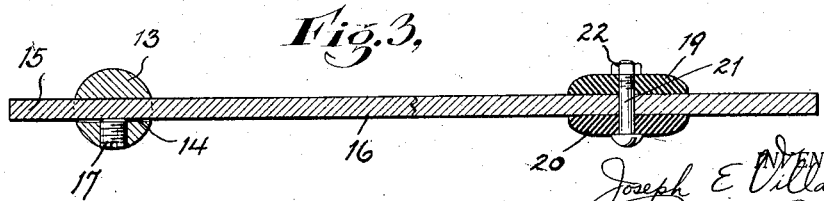

Patented July 7, 1931

1,813,370

UNITED STATES PATENT OFFICE

JOSEPH E. VILLATORE, OF JERSEY CITY, NEW JERSEY, AND RUDOLPH ANELLO, OF BROOKLYN, NEW YORK, ASSIGNORS TO GEORGE SCIACCA, OF NEW YORK, N. Y.

HUNTER'S DUCK DECOY

Application filed September 24, 1929. Serial No. 394,905.

This invention relates to hunter's decoy ducks employed to lure wild game.

One of the objects of our invention is to provide an improvement in a decoy duck which will prevent the floating decoy body from capsizing or turning upside down.

Another object of our invention is to provide a duck decoy with a life like turning movement of the head constructed and arranged to cooperate with a spatula blade or vane connected to and below the floating decoy body and which rotates or oscillates due to the natural wave action or water currents.

More specifically our invention relates to an improvement in duck decoys in which the head portion of the decoy oscillates or rotates with a blade or vane connected to and below the decoy body, said blade or vane having a rudder portion and counterbalancing means which maintains the decoy body in equilibrium.

To enable others skilled in the art to more fully comprehend the underlying features of our invention, reference is had to the accompanying drawings forming a part of the specification in which Fig. 1 is a perspective view illustrating our invention.

Fig. 2 is an enlarged view partly in section showing the rotatable head and vane or blade connection.

Fig. 3 is a section taken on the line 3—3 of Fig. 2.

Referring now to the drawings wherein like reference characters designate corresponding parts throughout the several views, 5 designates a floating decoy body which is preferably of wood and usually carved and painted to resemble the appearance of a wild duck. The front body portion of the decoy is formed with a vertical opening in which is positioned a journal bushing 6. A freely rotatable head 7 on the decoy body is also provided with an opening for an internally threaded sleeve or nipple 8.

Extending through the journal bushing is a rod or stem 9, the upper end of which is threaded as at 10 to be fastened into the nipple or sleeve within the head portion of the decoy. An anti-friction spacing disk 11 is interposed between the bottom of the head and the decoy body so that the head may turn freely relative to the body.

The opposite, threaded end 12 of the rod or stem 9 is threaded and fastened to a counterbalancing post 13. The post is slotted from front to back as at 14 to receive the front end 15 of what I term a spatula blade or vane 16, the front end of which passes through the slotted post and is fastened thereto by a screw 17. The blade or vane is formed with a rear rudder portion 18 which affords a greater surface area to engage the water, this construction being such that it prevents the decoy body from tilting or turning over when in rough or choppy water. As seen in Figs. 2 and 3, the rudder portion of the vane or blade is provided with a pair of weights 19, 20 fastened together by a screw 21 and nut 22. In actual practice, the best results are obtained when the combined weight of the members 19, 20 is equal to the weight of the front post 13. The centre of gravity is consequently intermediate the ends of the blade or vane, thus maintaining it when in the water in a perfectly horizontal position. It will thus be seen that when the floating decoy body is positioned in the water, the natural wave motion, eddies or currents will partially rotate and oscillate the vane or blade thus similarly moving the stem and the head to simulate the natural action of wild game. All the elements included in the improvement above set forth are easily assembled, replaceable and interchangeable so that the decoy bodies may be quickly equipped by the hunter and positioned in the water and subsequently dissembled. Due to the fact that the vane or blade prevents the body from tilting over, very few of the decoys are thus lost.

While we have shown and described our invention with some degree of particularity, it will be realized that other modifications and changes may be resorted to under special conditions. We therefore do not wish to be limited and restricted to the exact details shown and described but reserve the right to make such changes and modifications as may fairly fall within the scope of the subject matter now being claimed.

Having shown and described our invention, what we claim as new and desire to secure by Letters Patent is:

1. A decoy duck comprising a body portion, a stem passing through said body, a freely rotatable head fastened to the upper end of the stem, and a counterbalanced vane connected to the lower end of the said stem and extending from said stem in a direction substantially opposite to that in which said head extends from said stem.

2. A decoy duck comprising a body portion, a stem passing through said body portion, a freely rotatable head fastened to the upper end of the stem and a detachable, counterbalanced vane transversely adjustably connected to the lower end of the stem.

3. A decoy duck comprising a body portion having a vertical journal bushing, a stem passing through said bushing, a freely rotatable head fastened to the upper end of the stem, a slotted post connected to and extending over the lower end of the stem and a counterbalanced vane horizontally adjustably carried by said slotted post.

4. A decoy duck comprising a body portion having a vertical journal bushing, a stem passing through said bushing, a freely rotatable head fastened to the upper end of the stem, a slotted post on the lower end of the stem, and a counterbalanced vane having a backwardly and downwardly extending rear rudder carried by said slotted post.

5. A decoy duck comprising a body portion having a vertical journal bushing, a stem passing through said bushing, a freely rotatable head fastened to the upper end of the stem, a slotted post on the lower end of the stem, a vane having a rear rudder carried by said slotted post, weights attached to the rudder below the level of said post, said post being counterbalanced by said weights whereby the vane is maintained in a horizontal position.

6. A decoy duck comprising a body portion, a vertical journal bushing passing through said body, a stem within the bushing, a freely rotatable head on the upper end of the stem, a slotted post carried by the lower end of the stem, a flat vane having its front end passing through and horizontally adjustably fastened to the post, a rudder formed with the rear portion of the vane, weights replaceably attached to the rudder portion on each side thereof, said post being counterbalanced by said weights to maintain the vane in a horizontal position and prevent tilting of the body.

In testimony whereof we affix our signatures.

JOSEPH E. VILLATORE.
RUDOLPH ANELLO.